United States Patent
Nitta et al.

(10) Patent No.: US 11,205,983 B2
(45) Date of Patent: Dec. 21, 2021

(54) MOTOR CONTROL DEVICE AND MOTOR CONTROL METHOD

(71) Applicant: KABUSHIKI KAISHA YASKAWA DENKI, Kitakyushu (JP)

(72) Inventors: Koichi Nitta, Kitakyushu (JP);
Mitsunori Sato, Kitakyushu (JP);
Hiroyuki Imayoshi, Kitakyushu (JP);
Tadanori Matsushita, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 0 days.

(21) Appl. No.: 16/930,331

(22) Filed: Jul. 16, 2020

(65) Prior Publication Data
US 2021/0028736 A1 Jan. 28, 2021

(30) Foreign Application Priority Data
Jul. 24, 2019 (JP) .............................. JP2019-136422

(51) Int. Cl.
*H02P 23/14* (2006.01)
*H02P 23/00* (2016.01)
*H02P 27/06* (2006.01)

(52) U.S. Cl.
CPC .......... *H02P 23/14* (2013.01); *H02P 23/0004* (2013.01); *H02P 27/06* (2013.01); *H02P 2205/01* (2013.01)

(58) Field of Classification Search
CPC ...... H02P 1/00; H02P 1/04; H02P 1/12; H02P 1/16; H02P 1/163; H02P 1/18; H02P 1/22; H02P 1/24; H02P 1/26; H02P 1/265; H02P 1/28; H02P 1/30; H02P 1/42; H02P 1/46; H02P 1/465; H02P 1/50; H02P 1/54;
(Continued)

(56) References Cited

FOREIGN PATENT DOCUMENTS

JP 2001-169579 6/2001
JP 2001169579 A * 6/2001 ............... H02P 5/00
(Continued)

OTHER PUBLICATIONS

Japanese Office Action for corresponding JP Application No. 2019-136422, dated Nov. 25, 2020 (w/ English machine translation).

*Primary Examiner* — Antony M Paul
(74) *Attorney, Agent, or Firm* — Mori & Ward, LLP

(57) ABSTRACT

A motor control device includes a first storage configured to store indicated values of control parameters, motor control circuitry configured to control a motor based on the indicated values stored in the first storage, primary setting circuitry configured to set in the first storage at least one indicated value among the indicated values as a primary indicated value which corresponds to specific parameter among the control parameters, secondary setting circuitry configured to replace, based on a change instruction input via a terminal, the primary indicated value stored in the first storage with a secondary indicated value in accordance with the change instruction, and resetting circuitry configured to replace the secondary indicated value stored in the first storage with the primary indicated value when a return requirement is satisfied after the secondary setting circuitry has replaced the primary indicated value with the secondary indicated value.

8 Claims, 9 Drawing Sheets

(58) Field of Classification Search
CPC ...... H02P 3/00; H02P 4/00; H02P 5/00; H02P 6/005; H02P 6/006; H02P 6/04; H02P 6/08; H02P 6/12; H02P 6/14; H02P 6/15; H02P 6/20; H02P 6/26; H02P 6/28; H02P 6/32; H02P 7/00; H02P 7/29; H02P 8/00; H02P 8/24; H02P 8/26; H02P 9/00; H02P 21/00; H02P 21/14; H02P 21/34; H02P 27/00; H02P 27/04; H02P 27/06; H02P 23/14; H02P 23/0004; H02P 23/00; H02P 23/07; H02P 23/0022

See application file for complete search history.

(56) References Cited

FOREIGN PATENT DOCUMENTS

| | | | |
|---|---|---|---|
| JP | 2009-183083 | 8/2009 | |
| JP | 2009-213333 | 9/2009 | |
| JP | 2009213333 A * | 9/2009 | ............. H02P 27/06 |
| JP | 2012-60710 | 3/2012 | |

\* cited by examiner

MOTOR CONTROL DEVICE AND MOTOR CONTROL METHOD

CROSS-REFERENCE TO RELATED APPLICATIONS

The present application claims priority under 35 U.S.C. § 119 to Japanese Patent Application No. 2019-136422, filed Jul. 24, 2019. The contents of this application are incorporated herein by reference in their entirety.

BACKGROUND OF THE INVENTION

Field of the Invention

The present invention relates to a motor control device and a motor control method.

Discussion of the Background

Japanese Patent Application Publication No. 2012-060710 describes a motor control system configured to execute, after a lapse of a predefined certain time from execution of a threshold value changing process, a process of returning a threshold value to a first threshold value from a second threshold value.

For example, multiple parameters are sometimes prepared for controlling a motor. As to a specific one of the parameters, there may arise a need to temporarily change the value from the initial set value only during an adjustment to the motor before a normal run or a test run, and then return the changed value to the initial set value after the adjustment or the test run. When an operator temporarily changes the value of the specific parameter and returns the changed value to the initial set value, for example, the operator may inadvertently forget to return the changed value to the initial set value.

SUMMARY OF THE INVENTION

According to one aspect of the present invention, a motor control device includes a first storage configured to store indicated values of control parameters, motor control circuitry configured to control a motor based on the indicated values stored in the first storage, primary setting circuitry configured to set in the first storage at least one indicated value among the indicated values as a primary indicated value which corresponds to specific parameter among the control parameters, secondary setting circuitry configured to replace, based on a change instruction input via a terminal, the primary indicated value stored in the first storage with a secondary indicated value in accordance with the change instruction, and resetting circuitry configured to replace the secondary indicated value stored in the first storage with the primary indicated value when a return requirement is satisfied after the secondary setting circuitry has replaced the primary indicated value with the secondary indicated value.

According to another aspect of the present invention, a motor control method includes storing indicated values of control parameters, controlling a motor based on the indicated values stored in the first storage, setting in the first storage at least one indicated value among the indicated values as a primary indicated value which corresponds to specific parameter among the control parameters, replacing, based on a change instruction input via a terminal, the primary indicated value stored in the first storage with a secondary indicated value in accordance with the change instruction, and replacing the secondary indicated value stored in the first storage with the primary indicated value when a return requirement is satisfied after the secondary setting circuitry has replaced the primary indicated value with the secondary indicated value.

DESCRIPTION OF EMBODIMENTS

An embodiment will be described below with reference to the drawings.

Exemplary Configuration of Motor Control System

Figure 1:
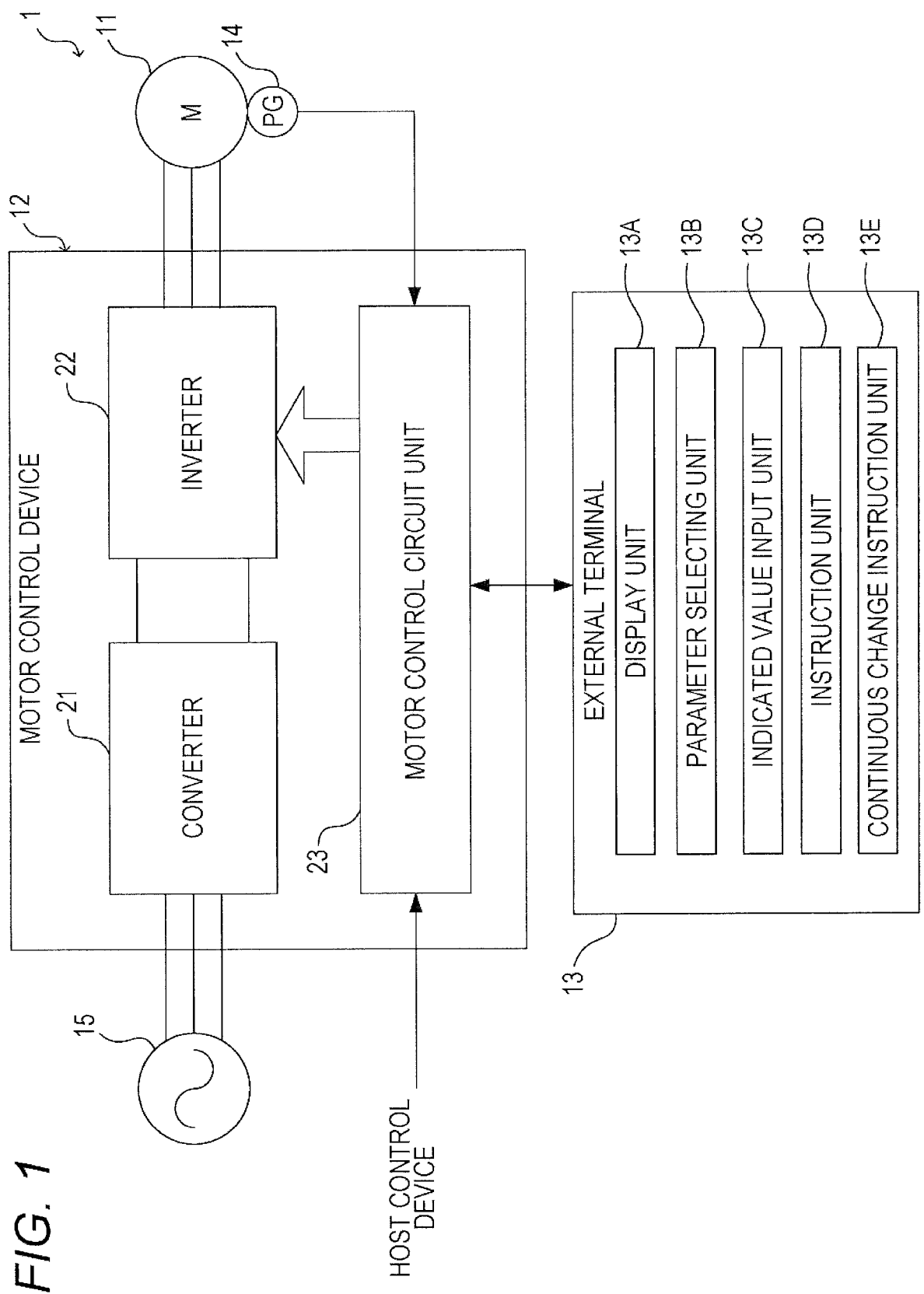
FIG. 1 is a block diagram of an exemplary configuration of a motor control system according to an embodiment.

With reference to FIG. 1, first, a description will be given of an exemplary configuration of a motor control system according to the present embodiment. FIG. 1 is a schematic block diagram of a hardware configuration of the motor control system according to the present embodiment. As illustrated in FIG. 1, the motor control system 1 includes a motor 11, a motor control device 12, and an external terminal 13.

The motor 11 is an electric motor that is driven with electric power to be fed from the motor control device 12 to be described later (hereinafter, the electric power is appropriately referred to as feed power) to convert the energy into a mechanical force or a displacement. The motor 11 may be of various types, such as a rotary type, a direct-acting type, a synchronous type, and an inductive type, selectable depending on a difference in mechanical configuration or electromagnetic operating method. In this example, the motor 11 includes a position detector 14 capable of detecting an output displacement.

The motor control device 12 receives alternating-current (AC) power from an AC power source 15, converts the AC power into appropriate feed power, feeds the appropriate feed power to the motor 11, and controls the driven state of the motor 11. The motor control device 12 mainly includes a converter 21, an inverter 22, and a motor control circuit unit 23.

The converter 21 includes a rectifier circuit and a smoothing circuit (not illustrated). The converter 21 receives AC power from the AC power source 15, and converts the AC power into desired direct-current (DC) power. The inverter 22 includes a bridge circuit (not illustrated) that includes a plurality of semiconductor switching elements. The inverter 22 receives DC power from the converter 21, converts the DC power into desired feed power, and feeds the desired feed power to the motor 11.

The motor control circuit unit 23 receives a command from a host control device (not illustrated), an output current value from the inverter 22, and a detection signal of an output displacement from the position detector 14 in the motor 11. The motor control circuit unit 23 controls power conversion by the inverter 22, based on the received command, output current value, and detection signal. The motor control device 12 according to the present embodiment has a plurality of control parameters for the control of the motor 11, specifically the control of the inverter 22. The motor control circuit unit 23 controls the power conversion by the inverter 22, based on an indicated value (to be described later) of each control parameter set by the external terminal 13 and an input signal from the host control device or an external device (not illustrated).

The external terminal 13 (an example of a terminal) may be, for example, a general-purpose personal computer or an engineering tool disposed separately from the motor control device 12, in addition to a dedicated terminal device for the motor control device 12. The external terminal 13 is externally connected to the motor control device 12 to exchange various kinds of information with the motor control device 12. The external terminal 13 may alternatively be an information terminal such as a mobile phone or a personal digital assistant. The external terminal 13 and the motor control device 12 may exchange information through wired communications or through wireless communications complying with an appropriate standard.

The external terminal 13 includes a display unit 13A, a parameter selecting unit 13B, an indicated value input unit 13C, an instruction unit 13D, and a continuous change instruction unit 13E. In setting or changing a parameter as will be described later, the display unit 13A of the external terminal 13 displays a parameter setting screen (not illustrated) based on information received from the motor control device 12. The external terminal 13 transmits, to the motor control device 12, a parameter change command for changing a value of each control parameter to an indicated value desired by an operator, based on a parameter selecting operation performed by the operator through the parameter selecting unit 13B, an indicated value inputting operation performed by the operator through the indicated value input unit 13C, and a parameter change instructing operation (an example of a change instruction) performed by the operator through the instruction unit 13D or the continuous change instruction unit 13E after the input of the indicated value. The display unit 13A of the external terminal 13 may be, for example, a liquid crystal display or an organic electroluminescent display. The parameter selecting unit 13B, indicated value input unit 13C, instruction unit 13D, and continuous change instruction unit 13E may typically be various keys on a dedicated terminal device (a key pad) to be described later. Alternatively, the external terminal 13 may include a touch panel having a display function as the display unit 13A and operating functions as the parameter selecting unit 13B, indicated value input unit 13C, instruction unit 13D, and continuous change instruction unit 13E.

Figure 2:
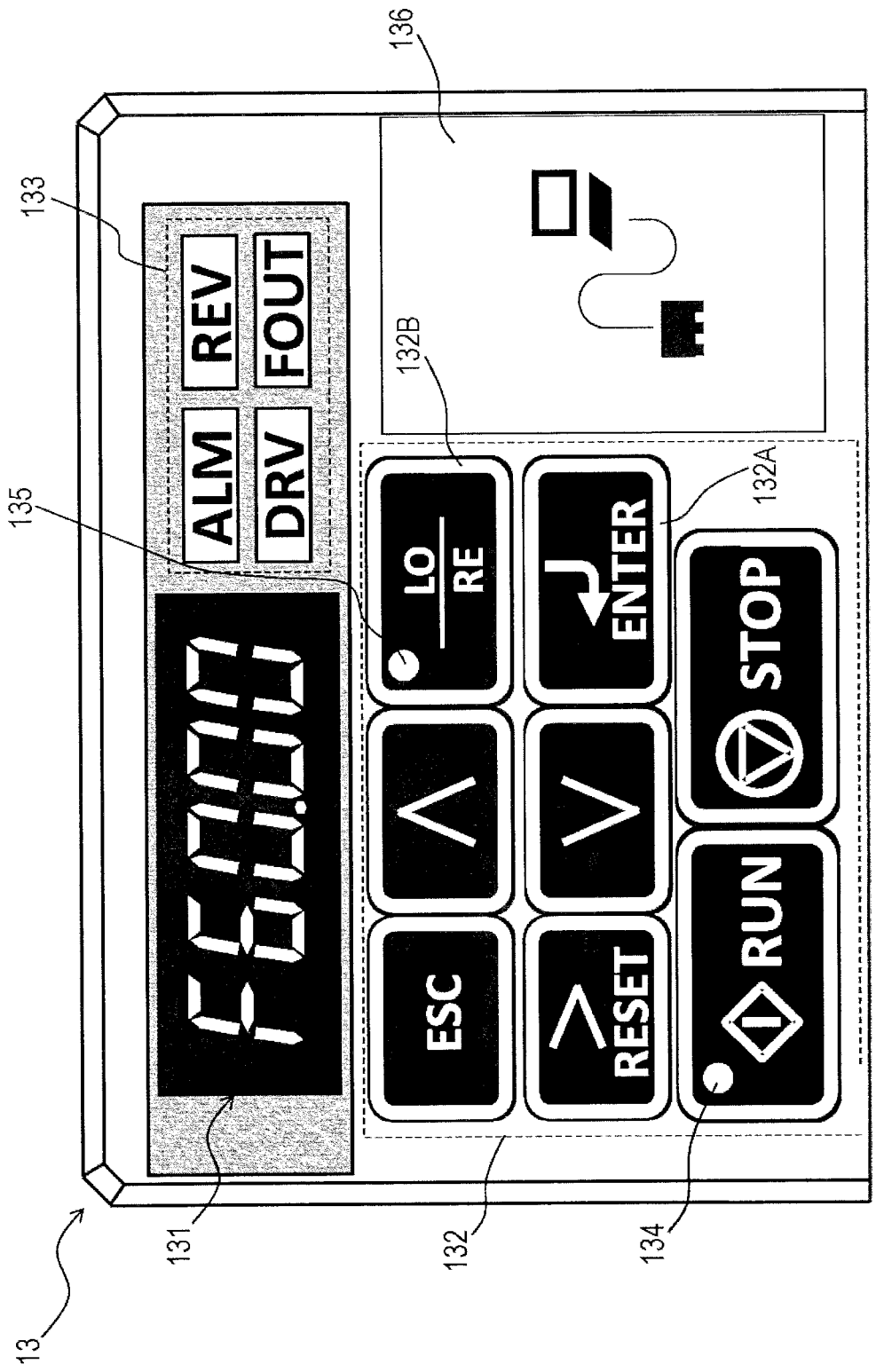
FIG. 2 is an explanatory diagram of an exemplary appearance configuration of a dedicated terminal device to be used as an external terminal.

In the case where the external terminal 13 is a dedicated terminal device, its appearance roughly takes a form illustrated in FIG. 2. In the example illustrated in FIG. 2, the external terminal 13 includes, for example, a data display unit 131 that displays a frequency and a parameter number using a combination of numerals from 0 to 9 with alphabets, various input keys 132, an LED lamp 133 that displays statuses such as abnormality detection (ALM), reverse command input (REV), drive mode (DRY), and output frequency display (FOUT), a RUN lamp 134 that lights up during the running of the motor control device 12, an LO/RE lamp 135 that lights up during a period in which the operator selects a continuous change mode, and a communication connector 136 that establishes communications with an external device.

Features of the Present Embodiment

According to the present embodiment, as described above, the indicated value of each control parameter for the inverter 22 is settable and changeable in accordance with the operations by the operator through the external terminal 13. In such a case, for example, as to a certain specific parameter, there may arise a need to temporarily change the value from the initial set value only during an adjustment to the motor before a normal run, specifically an adjustment to the motor control device 12 or a test run, and then return the changed value to the initial set value after the adjustment. When the operator temporarily changes the value of the specific parameter and returns the changed value to the initial set value, for example, the operator may inadvertently forget to return the changed value to the initial set value.

Exemplary Configuration of Motor Control Circuit Unit

Figure 3:
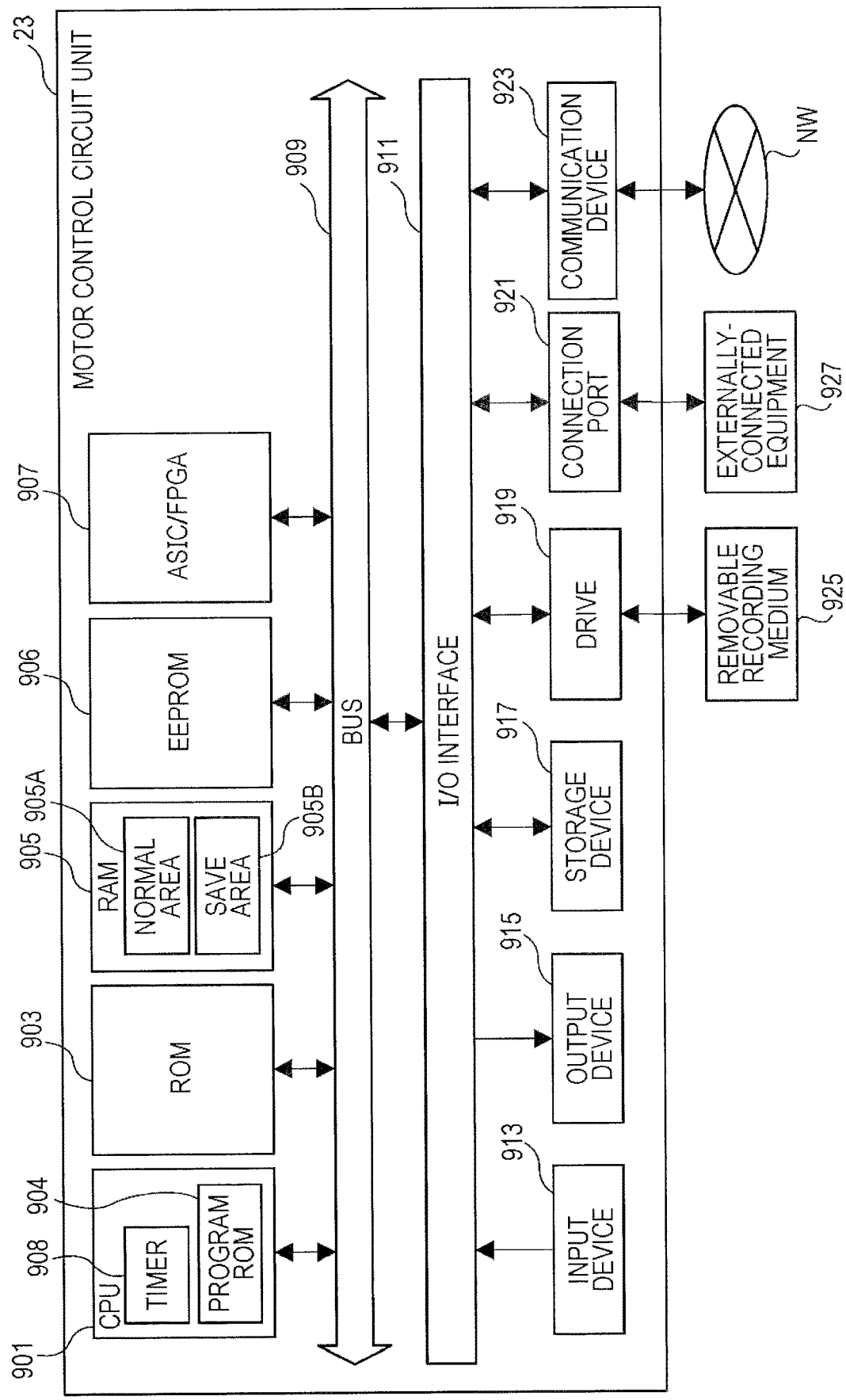
FIG. 3 is a functional block diagram of an exemplary hardware configuration of a motor control circuit unit.
Figure 4:
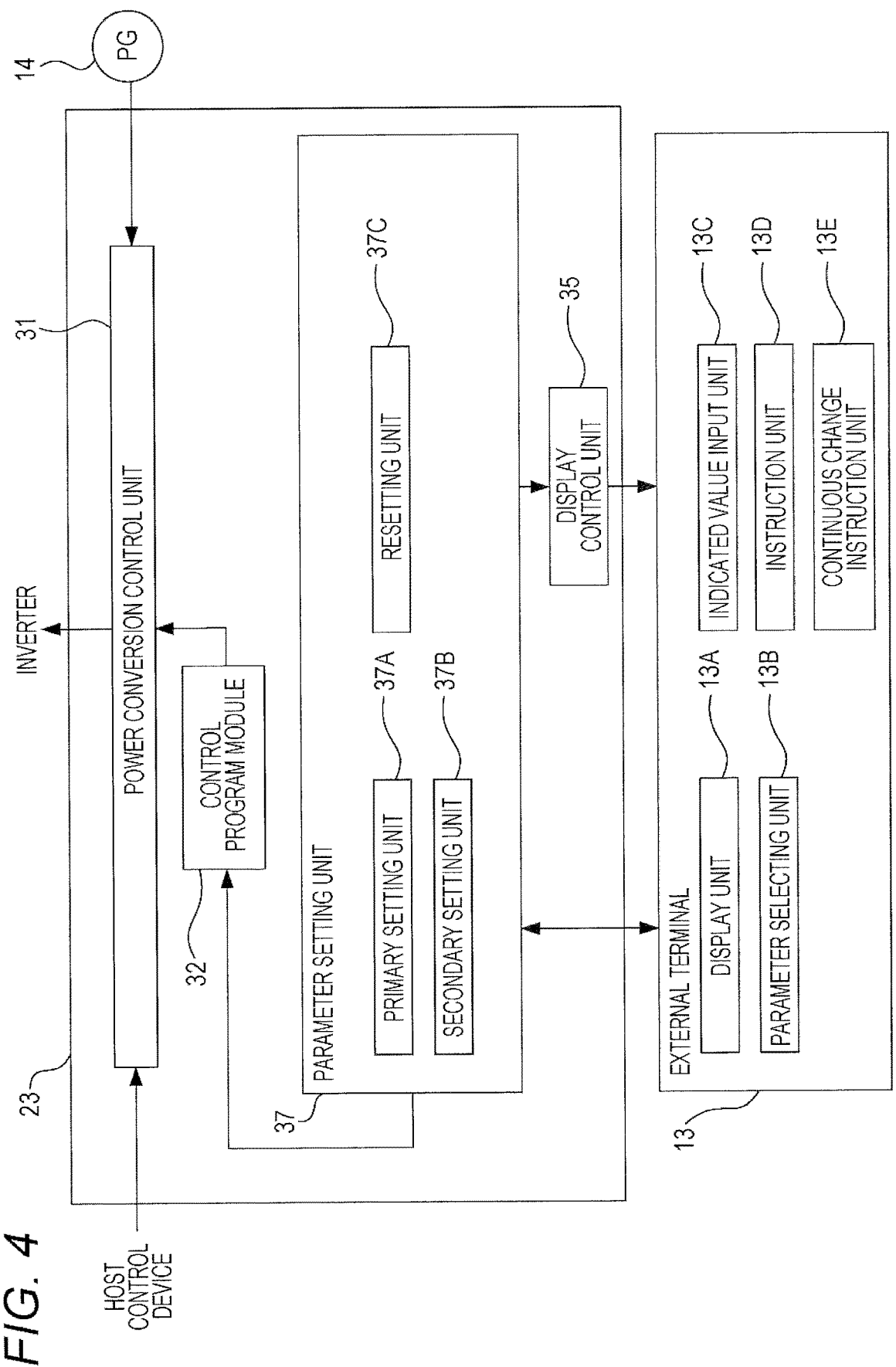
FIG. 4 is a schematic software block diagram of details of processing to be executed by the motor control circuit unit.

With reference to FIGS. 3 and 4, next, a description will be given of an exemplary configuration of the motor control circuit unit 23 for addressing the foregoing matters.

FIG. 3 illustrates an exemplary hardware configuration of the motor control circuit unit 23.

As illustrated in FIG. 3, the motor control circuit unit 23 includes, for example, a central processing unit (CPU) 901 that includes a storage area for an inverter control program (a program read only memory (ROM) 904) and a timer 908, a ROM 903 (an example of a second storage), a random access memory (RAM) 905 (an example of a first storage), an electrically erasable/programmable read only memory (EEPROM) 906, a dedicated integrated circuit 907 constructed for specific application, such as an application-specific integrated circuit or a field-programmable gate array, an input device 913, an output device 915, a connection port 921, and a communication device 923. The motor control circuit unit 23 also includes an appropriate storage device 917 and a drive 919 as necessary. The RAM 905 has a normal area 905A (an example of a first area) and a save area 905B (an example of a second area) disposed separately from the normal area 905A (the details will be described later). These constituent elements are connected via a bus 909 and an input-output (I/O) interface 911 to achieve mutual signal transfer.

The storage device 917 is an example of a recording device, and is capable of recording, for example, a program to be described later. The program is stored in the program ROM 904 of the CPU 901. Alternatively, the program may be stored in one of the ROM 903, the RAM 905, and the EEPROM 906.

The program may also temporarily or permanently be recorded in a removable storage medium 925. Examples of the removable storage medium 925 may include magnetic disks such as a flexible disk, various optical disks such as a compact disk, a magneto-optical disk, and a digital versatile disk, and semiconductor memories. The removable storage medium 925 may also be provided in the form of packaged software. In this case, the program recorded in the removable storage medium 925 may be read by the drive 919 and recorded in the recording device via the I/O interface 911, the bus 909, and the like.

Alternatively, the program may be recorded in, for example, a download site, another computer, or another recording device (not illustrated). In this case, the program is transferred through a network NW such as a local area network or the Internet, and the communication device 923 receives the program. The program received by the communication device 923 may be recorded in the recording device via the I/O interface 911, the bus 909, and the like.

Alternatively, the program may be recorded in, for example, appropriate externally-connected equipment 927. In this case, the program may be transferred through the appropriate connection port 921 and recorded in the recording device via the I/O interface 911, the bus 909, and the like.

Exemplary Configuration of Software Block Executed by Motor Control Circuit Unit FIG. 4 is a schematic software block diagram of the details of processing to be embodied by the motor control circuit unit 23 in such a manner that the CPU 901 executes various processes in accordance with the program recorded in, for example, the foregoing recording device. As illustrated in FIG. 4, the motor control circuit unit 23 includes, as a functional unit, a power conversion control unit 31, a display control unit 35, and a parameter setting unit 37. As described above, these functional units are implemented by the program which the CPU 901 executes.

The power conversion control unit 31 (an example of a motor control circuitry) receives, for example, a command such as a speed command from the host control device, a detection signal of an output displacement from the position detector 14 in the motor 11, and an output current value from the inverter 22. The power conversion control unit 31 controls power conversion by predetermined loop control and pulse width modulation control, based on the received command, detection signal, and output current value. The power conversion control unit 31 outputs, to the inverter 22, a switch signal for the semiconductor switching elements in the inverter 22, based on the power conversion control. This enables control of feed power from the inverter 22 to the motor 11.

At this time, a control program module 32 of the motor control circuit unit 23 executes the process of power conversion control which the power conversion control unit 31 performs on the inverter 22. For the process, the parameter setting unit 37 sets values (indicated values) of the control parameters, for use in the control program module 32. The control program module 32 executes the power conversion control process by reference to indicated values set in the normal area 905A of the RAM 905 (the details will be described later). The parameter setting unit 37 receives the parameter change command from the external terminal 13, and sets the indicated values of the control parameters, based on the parameter change command. The parameter setting unit 37 includes a primary setting unit (primary setting circuitry) 37A, a secondary setting unit (secondary setting circuitry) 37B, and a resetting unit (resetting circuitry) 37C. The parameter setting unit 37 controls input and output of the indicated values of the control parameters to and from the ROM 903, the normal area 905A and save area 905B of the RAM 905, and the EEPROM 906 (the details will be described later).

The display control unit 35 generates a display control signal that causes the display unit 13A of the external terminal 13 to display information on the indicated values of the control parameters. The display control unit 35 then outputs the display control signal to the external terminal 13. The display unit 13A of the external terminal 13 displays the parameter setting screen, based on the display control signal.

The foregoing processes in the motor control circuit unit 23 are not limited to the example of the processes shared among the foregoing functional units 31, 32, 35, and 37. For example, the foregoing processes may be executed by one functional unit or may be shared among and executed by functional units that are further subdivided.

Settings of Control Parameters Other than Specific Parameter in Motor Control Device In the motor control device 12, all the control parameters and the indicated values thereof are recorded in the ROM 903 and the EEPROM 906. The ROM 903 stores indicated values of all the control parameters at factory shipment. When a user changes settings of control parameters other than a specific parameter, the EEPROM 906 stores the changed values.

In changing the indicated values of the control parameters using the external terminal 13 illustrated in FIG. 2, the operator selects a parameter setting mode (the details will be described later), selects a parameter number, and changes an indicated value of the parameter, through the input keys 132, and then presses an ENTER key 132A, thereby changing the indicated value of the selected control parameter.

When the operator performs a parameter change instructing operation through the continuous change instruction unit 13E after the input of a series of indicated values, the external terminal 13 transmits, to the motor control device 12, a parameter change command for changing the values of the respective control parameters to indicated values desired by the operator, based on the parameter change instructing operation. As to the control parameters other than the specific parameter, the motor control device 12 rewrites the indicated values of the parameters in the normal area 905A of the RAM 905 and the indicated values of the parameters in the EEPROM 906.

At power-on of the motor control device 12, the motor control device 12 reads the indicated values of the control parameters stored in the ROM 903, and stores a copy of the indicated values in the normal area 905A. The motor control device 12 then reads the indicated values of the control parameters stored in tin the EEPROM 906, and overwrites the indicated values in the normal area 905A.

According to this configuration, as to the control parameters other than the specific parameter, the indicated values of the control parameters changed by the user are reflected even after the power is turned on again. Moreover, the indicated values of the control parameters are returned to the initial set values at factory shipment by reading the indicated values of the control parameters stored in the ROM 903 and storing a copy of the indicated values in the EEPROM 906.

Outline of Method According to the Present Embodiment

Figure 5:
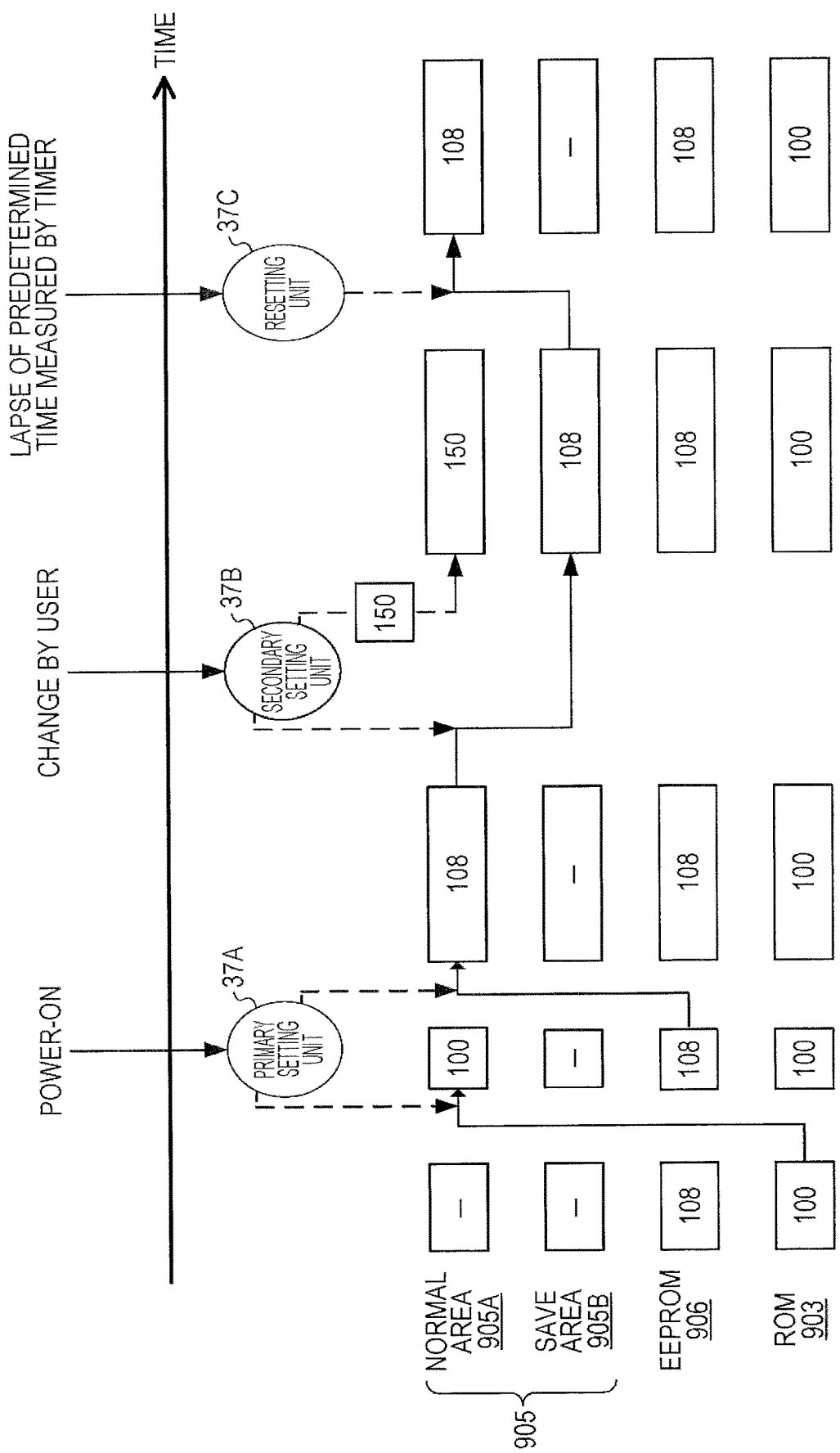
FIG. 5 is an explanatory diagram of an outline of a method according to the present embodiment, the method being performed by a primary setting unit, a secondary setting unit, and a resetting unit in a parameter setting unit.

With reference to FIG. 5, a description will be given of the outline of a method according to the present embodiment, the method being performed by the primary setting unit 37A, the secondary setting unit 37B, and the resetting unit 37C in the parameter setting unit 37 in order to address the temporary change in the value of the specific parameter, the return of the changed value to the initial set value, and the lack of memory as to returning the changed value to the initial set value.

In the example illustrated in FIG. 5, first, the ROM 903 stores, for example, an initial value "100" of the specific parameter that is written at factory shipment, in a state prior to power-on (to be described later). It should be noted that this initial value "100" is held in the ROM 903 without being rewritten. The EEPROM 906 also previously stores an indicated value "108" of the specific parameter in the state prior to power-on (to be described later). With regard to the indicated value "108", the operator selects the specific parameter through the parameter selecting unit 13B of the external terminal 13, inputs the indicated value "108" through the indicated value input unit 13C of the external terminal 13, and instructs a change in the indicated value "108" through the continuous change instruction unit 13E of the external terminal 13.

Thereafter, at the power-on of the motor control device 12, the primary setting unit 37A of the parameter setting unit 37 reads the initial value "100" from the ROM 903, writes the initial value "100" into the normal area 905A of the RAM 905, and sets the initial value "100" as an indicated value in the normal area 905A. Likewise, the primary setting unit 37A reads the indicated value "108" from the EEPROM 906, and writes the indicated value "108" into the normal area 905A. The primary setting unit 37A thus overwrites and updates the value stored in the normal area 905A, and sets the indicated value "108" as a primary indicated value in the normal area 905A.

Thereafter, for example, the operator performs the parameter change instructing operation of selecting the specific parameter through the parameter selecting unit 13B, inputting a new indicated value "150" through the indicated value input unit 13C, and changing the indicated value "108" to the indicated value "150" through the instruction unit 13D. Specifically, in changing the specific parameter using the external terminal 13 illustrated in FIG. 2, the operator selects a parameter setting mode, selects a parameter number, and changes an indicated value of the parameter through the input keys 132, and then presses the ENTER key 132A, thereby changing the indicated value of the selected control parameter. When the operator performs the parameter change instructing operation through the instruction unit 13D after the input of the series of indicated values, the external terminal 13 transmits, to the motor control device 12, a parameter change command for changing the value of each control parameter to an indicated value desired by the operator, based on the parameter change instructing operation. The parameter setting unit 37 then receives the relevant parameter change command from the external terminal 13. The secondary setting unit 37B thus reads the primary indicated value "108" from the normal area 905A, and writes the primary indicated value "108" into the save area 905B of the RAM 905. Likewise, the secondary setting unit 37B writes the new indicated value "150" into the normal area 905A, thereby overwriting and updating the value stored in the normal area 905A, and setting the indicated value "150" as a secondary indicated value in the normal area 905A. In other words, the secondary indicated value "150" is set in place of the primary indicated value "108" in the normal area 905A. The timer 908 starts to measure a time elapsed from the setting of the secondary indicated value in the normal area 905A.

When the timer 908 starts the measurement, the resetting unit 37C transmits, during a period in which a return requirement is not satisfied, a signal indicating that the return requirement is not satisfied to the external terminal 13. The external terminal 13 may be configured to display information indicating that the return requirement is not satisfied on the data display unit 131, based on the signal.

Figure 6:
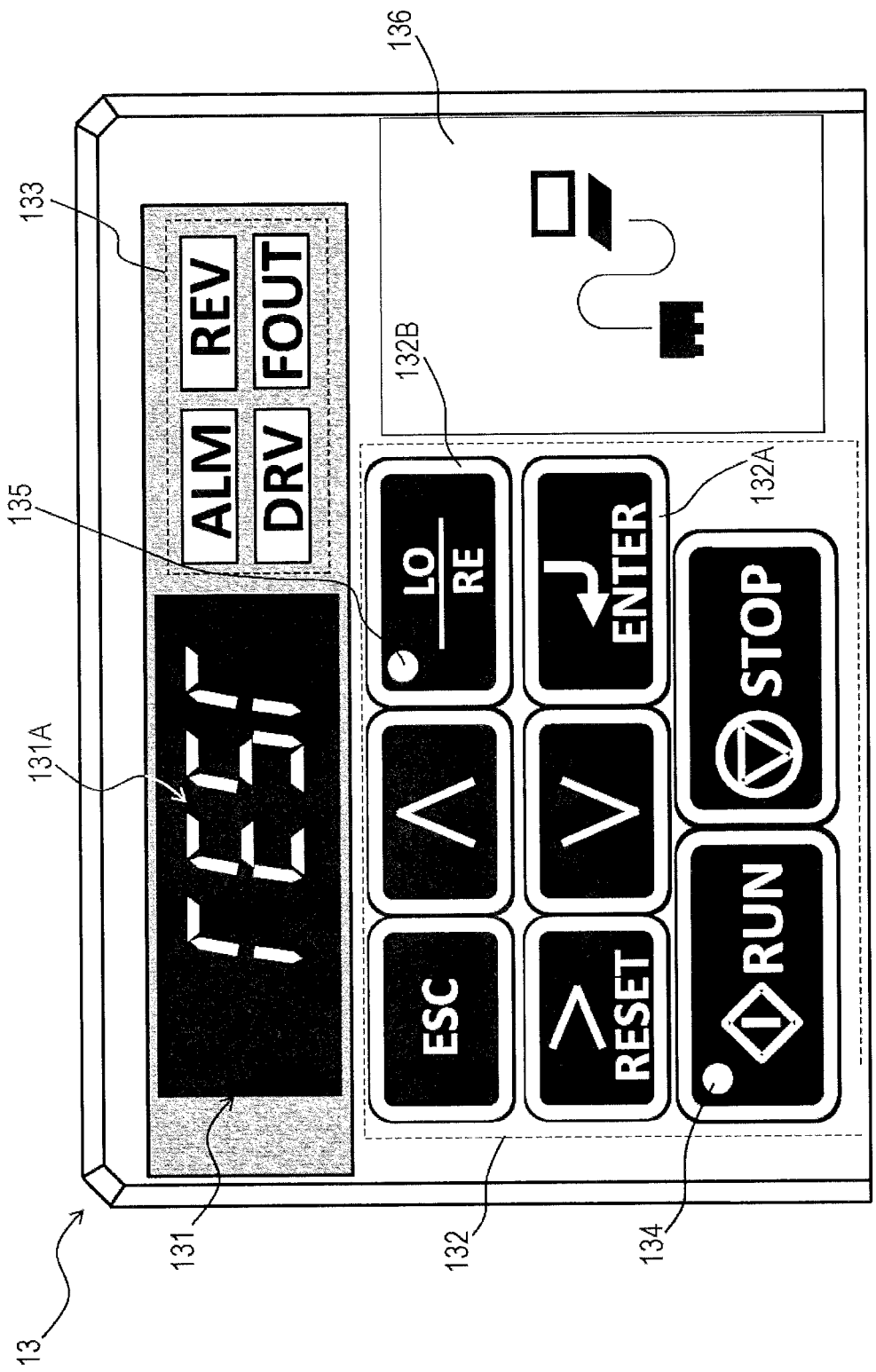
FIG. 6 is an explanatory view of exemplary display on the dedicated terminal in a state in which a timer is operated.

With reference to FIG. 6 similar to FIG. 2, a description will be given of exemplary display on the dedicated terminal in the state in which the timer 908 is operated. The resetting unit 37C transmits a signal indicating that the indicated value of the specific parameter is temporarily changed, to the display unit 13A such that the display unit 13A displays a character string of "TEST". The display unit 13A displays a character string 131A corresponding to "TEST" on the data display unit 131 such that the character string 131A is continuously displayed during a period in which the timer 908 measures the elapsed time.

With this configuration, the user is able to achieve an adjustment and a test run while confirming that the operation based on the indicated value of the specific parameter is performed provisionally.

Referring back to FIG. 5, when the elapsed time measured by the timer 908 reaches a predetermined time, the resetting unit 37C of the parameter setting unit 37 reads the primary indicated value "108" from the save area 905B, and writes the primary indicated value "108" into the normal area 905A of the RAM 905. The resetting unit 37C thus overwrites and updates the value stored in the normal area 905A so as to reset the indicated value to "108" in the normal area 905A. In other words, the primary indicated value "108" is reset in place of the secondary indicated value "150" in the normal area 905A. In the present embodiment, the elapsed time measured by the timer 908 is used as a requirement for resetting, in the normal area 905A, the primary indicated value set in the save area 905B, in other words, a return requirement for returning, to the primary indicated value, the indicated value of the specific parameter to be used in the power conversion control process which the control program module 32 executes. It is determined that the return requirement is satisfied on condition that the elapsed time reaches the predetermined time.

Examples of the control parameters may include, but not limited to, the maximum speed of the motor 11, the minimum speed of the motor 11, the resolution, speed loop gain, speed loop integration time, load level, torque or current command of the position detector 14, and a threshold value for issuing a predetermined alarm as to each of the foregoing items. Examples of the specific parameter may include, but not limited to, the maximum speed of the motor 11, and the threshold value of the torque or current command. It should be noted that the number of specific parameters is not limited to one. For example, the number of specific parameters may be two or more.

Continuous Setting Change in Specific Parameter

According to the setting of the specific parameter by the foregoing method, when the predetermined requirement is satisfied, the indicated value of the specific parameter is returned to the initial set value. That is, the indicated value of the specific parameter is not continuously changed.

Hence, the motor control device 12 additionally has a function of continuously changing the indicated value of the specific parameter.

Specifically, when the external terminal 13 issues the specific parameter change instruction while selecting a mode of continuously changing the indicated value of the specific parameter (hereinafter, appropriately referred to as a "continuous change mode"), the secondary setting unit 37B and the resetting unit 37C are not activated, but the primary setting unit 37A further rewrites the indicated value of the specific parameter stored in the ROM 903, based on the specific parameter change instruction.

For example, the external terminal 13 additionally has a function of selecting the continuous change mode. For example, in the case of using the external terminal 13 illustrated in FIG. 2, the operator presses the LO/RE key 132B to switch between a normal mode and the continuous change mode. In the continuous change mode, the LO/RE lamp 135 lights up.

In the continuous change mode, the operator selects the specific parameter by the foregoing method, changes the indicated value of the specific parameter, and then presses the ENTER key 132A, thereby continuously changing the indicated value of the selected specific parameter.

When the operator performs the parameter change instructing operation through the continuous change instruction unit 13E after the input of the series of indicated values, the external terminal 13 transmits, to the motor control device 12, the parameter change command for changing the value of the specific parameter to an indicated value desired by the operator based on the parameter change instructing operation. The motor control device 12 thus rewrites the parameter in the normal area 905A of the RAM 905 and the parameter in the EEPROM 906.

With this configuration, as to the specific parameter, the indicated value of the control parameter changed by the user is reflected even after the power is turned on again.

Control Procedure

With reference to a flowchart of FIG. 7, next, a description will be given of an exemplary control procedure to be executed by the parameter setting unit 37 in order to embody the foregoing method. This flow starts at the power-on of the motor control device 12, and is continuously executed until the parameter setting mode is canceled through the input keys 132. Although not illustrated in FIG. 7, in a case where the parameter setting mode is selected anew through the input keys 132 after the power-on of the motor control device 12, step S5 and step S10 (to be described later) are not carried out in the flowchart of FIG. 7.

Figure 7:
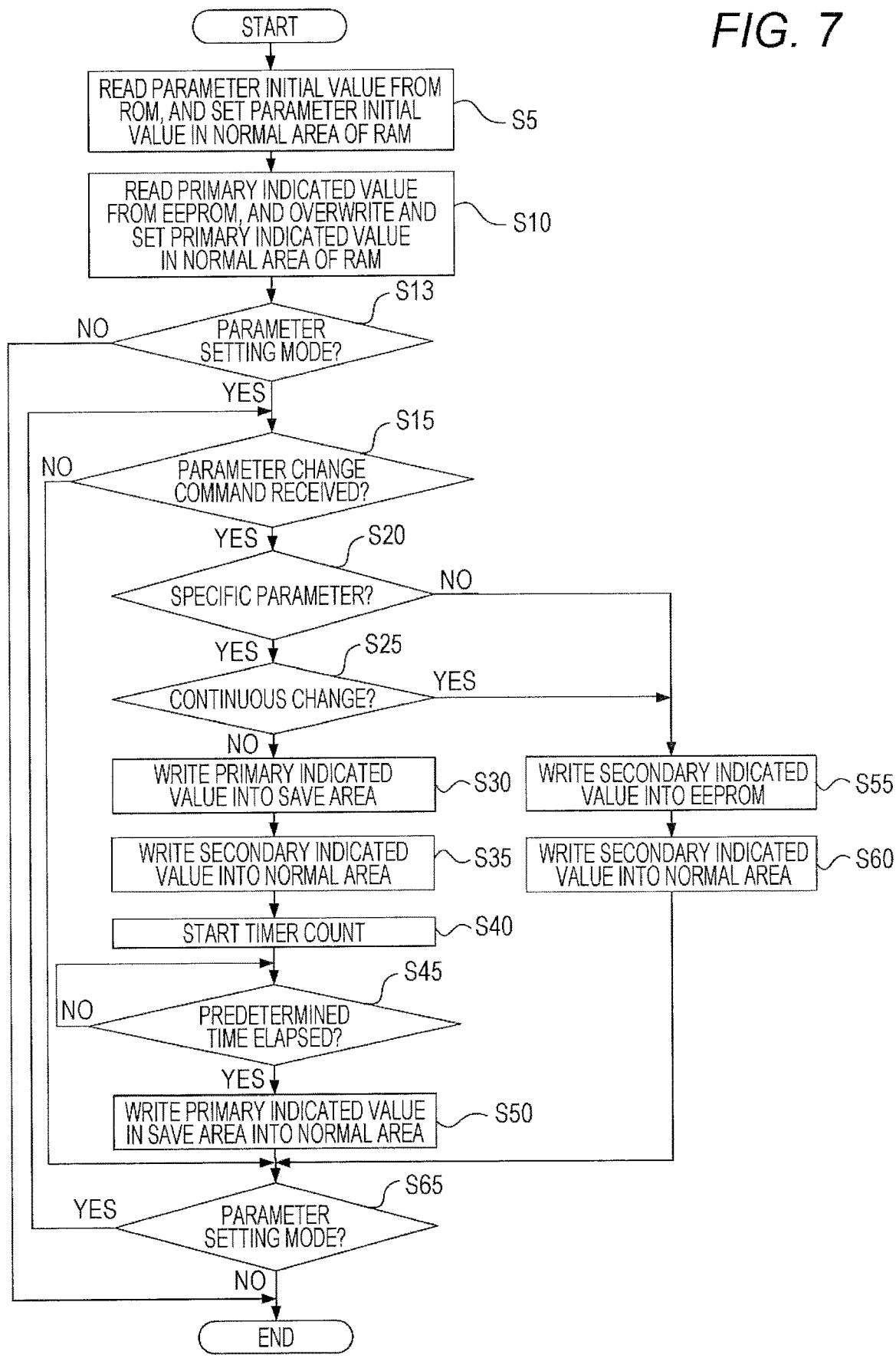
FIG. 7 is a flowchart of a control procedure to be executed by the parameter setting unit.

As illustrated in FIG. 7, in step S5 to be carried out first at the power-on, the primary setting unit 37A of the parameter setting unit 37 reads an initial value of a control parameter from the ROM 903, and writes the initial value into the normal area 905A of the RAM 905. The primary setting unit 37A thus sets the written initial value as an indicated value in the normal area 905A. In step S10, the primary setting unit 37A of the parameter setting unit 37 reads an indicated value from the EEPROM 906, and writes the indicated value into the normal area 905A in a manner similar to that described above. The primary setting unit 37A thus overwrites and updates the value stored in the normal area 905A, and sets the overwritten value as a primary indicated value in the normal area 905A. As a result, the control program module 32 executes the power conversion control process based on the primary indicated value set in the normal area 905A.

In step S13, next, the parameter setting unit 37 determines whether the external terminal 13 selects the parameter setting mode at this time. During a period in which the indicated value of the control parameter is set in the normal area 905A of the RAM 905 and the parameter setting mode is selected through the external terminal 13 (including a period in which the parameter setting mode is selected anew through the input keys 132), the determination in step S13 is satisfied (S13: YES). The processing then proceeds to step S15 in which the parameter setting unit 37 accepts a control parameter setting change.

In step S15, specifically, the parameter setting unit 37 determines whether to receive a parameter change command from the external terminal 13. When the parameter setting unit 37 receives no parameter change command, the determination is not satisfied (S15: NO). The processing then proceeds to step S65 in which the parameter setting unit 37 determines whether the parameter setting mode is selected. When the parameter setting unit 37 receives the parameter change command, the determination is satisfied (S15: YES). The processing then proceeds to step S20.

In step S20, the parameter setting unit 37 determines whether the parameter change command received in step S15 is a predetermined instruction for a specific parameter. When the parameter change command is not an instruction for a specific parameter, the determination is not satisfied (S20: NO). The processing then proceeds to step S55. When the parameter change command is an instruction for a specific parameter, the determination is satisfied (S20: YES). The processing then proceeds to step S25.

In step S25, the parameter setting unit 37 determines whether the parameter change command for the specific parameter received in step S15 is a continuous change which is not a temporary change based on the premise that the value of a specific parameter is returned to the initial set value.

In the present embodiment, specifically, the operator selects the specific parameter through the parameter selecting unit 13B, inputs the indicated value through the indicated value input unit 13C, and performs the parameter change instructing operation through the instruction unit 13D. The specific parameter is thus subjected to a specific parameter temporarily changing process capable of saving the primary indicated value in the save area 905B and resetting the primary indicated value in the normal area 905A after a lapse of a predetermined time. According to the present embodiment, in the case where the operator desires a continuous change in the specific parameter rather than a temporary change in the specific parameter as described above, in addition to the specific parameter temporarily changing process, for example, the operator selects the specific parameter through the parameter selecting unit 13B, inputs the indicated value through the indicated value input unit 13C, and then operates the continuous change instruction unit 13E (e.g., performs a specific parameter setting changing process by pressing the LO/RE key 132B) in place of the instruction operation through the instruction unit 13D. The specific parameter is thus subjected to a specific parameter continuously changing process.

In step S25, the parameter setting unit 37 determines whether the parameter change command for the specific parameter received in step S15 is the specific parameter continuously changing process based on the parameter change instructing operation through the continuous change instruction unit 13E, rather than the specific parameter temporarily changing process based on the parameter change instructing operation through the instruction unit 13D. When the parameter change command received in step S15 is an instruction for the specific parameter continuously changing process, the determination in step S25 is satisfied (S25: YES). The processing then proceeds to step S55.

In step S55, the secondary setting unit 37B of the parameter setting unit 37 writes into the EEPROM 906 the indicated value contained in the parameter change command received in step S15. The secondary setting unit 37B thus overwrites and updates the value stored in the EEPROM 906, and sets the overwritten value as a secondary indicated value in the EEPROM 906. In step S60, next, the secondary setting unit 37B of the parameter setting unit 37 also writes into the normal area 905A the indicated value contained in the parameter change command received in step S15. The secondary setting unit 37B thus overwrites and updates the value stored in the normal area 905A, and sets the overwritten value as a secondary indicated value in the normal area 905A. As a result, the control program module 32 executes the power conversion control process based on the secondary indicated value set in the normal area 905A. After step S60, the processing proceeds to step S65 in which the parameter setting unit 37 determines whether the parameter setting mode is selected.

On the other hand, when the parameter change command received in step S15 is an instruction for the specific parameter temporarily changing process in step S25, the determination in step S25 is not satisfied (S25: NO). The processing then proceeds to step S30.

In step S30, the secondary setting unit 37B of the parameter setting unit 37 reads the primary indicated value set in the normal area 905A of the RAM 905 in step S10, and writes the primary indicated value into the save area 905B. In step S40, next, the secondary setting unit 37B of the parameter setting unit 37 writes into the normal area 905A the indicated value contained in the parameter change command received in step S15. The secondary setting unit 37B thus overwrites and updates the value stored in the normal area 905A, and sets the overwritten value as a secondary indicated value in the normal area 905A. As a result, the control program module 32 executes the power conversion control process based on the secondary indicated value set in the normal area 905A.

Upon completion of the write of the secondary indicated value in step S35, the parameter setting unit 37 starts to count an elapsed time using the timer 908 in step S40.

In step S45, next, the parameter setting unit 37 determines whether the elapsed time measured by the timer 908 reaches the predetermined time. The determination is not satisfied (S45: NO) until the elapsed time reaches the predetermined time, so that the processing is in a loop standby state. When the elapsed time reaches the predetermined time, the determination is satisfied (S45: YES). The processing then proceeds to step S50.

In step S50, the resetting unit 37C of the parameter setting unit 37 reads the primary indicated value written in the save area 905B of the RAM 905 in step S30, and writes the primary indicated value in the normal area 905A again. The resetting unit 37C thus overwrites and updates the value stored in the normal area 905A with the primary indicated value. As a result, the control program module 32 executes the power conversion control process based on the primary indicated value again. After step S50, the processing proceeds to step S65.

In step S65, the parameter setting unit 37 determines whether the external terminal 13 selects the parameter setting mode at this time, in a manner similar to that in step S13 described above. The determination in step S65 is satisfied (S65: YES) during a period in which the parameter setting mode is selected through the external terminal 13. The processing then returns to step S15 in which the parameter setting unit 37 continues the acceptance of the control parameter setting change. When the external terminal 13 cancels the selection of the parameter setting mode, the determination in step S65 is not satisfied (S65: NO). The processing thus ends.

Exemplary Advantageous Effects of the Present Embodiment

As described above, in the present embodiment, first, the primary setting unit 37A of the parameter setting unit 37 sets the primary indicated value of the specific parameter in the RAM 905. When the operator performs the parameter change instructing operation through the external terminal 13 in order to temporarily change the primary indicated value thus set, the secondary setting unit 37B sets in the RAM 905 the secondary indicated value in accordance with the parameter change instructing operation, in place of the stored primary indicated value. The resetting unit 37C of the parameter setting unit 37 resets in the RAM 905 the initial primary indicated value in place of the stored secondary indicated value when the predetermined return requirement is satisfied after the secondary indicated value is set. As a result, in the case where the operator temporarily changes the value of the specific parameter through the operation by himself or herself, the changed value of the specific value is automatically returned to the initial value even when the operator does not perform the subsequent operation. This results in improvement of convenience for the operator.

A typical example of an advantageous effect of the present embodiment includes an advantageous effect to be produced in a case of using, as the specific parameter, the threshold value for issuing an alarm. At a test run before the motor control device 12 normally runs, the operator generally makes an adjustment to the motor control device 12 so as to largely increase or decrease the indicated value of each control parameter. At this time, if the threshold value for issuing an alarm is still set at a value for the normal run, an alarm is issued since the indicated value deviates from the threshold value each time the indicated value increases or decreases, which is troublesome. In many instances, to avoid this, the threshold value is changed by the parameter change instructing operation such that the indicated value does not deviate from the threshold value. It is necessary to remember that the changed threshold value is returned to the initial value after the test run. Applying the method according to the present embodiment enables automatic return of the threshold value to its initial value even when the operator does not perform an operation after the change of the threshold value.

According to the present embodiment, the RAM 905 has the normal area 905A and the save area 905B. When the operator performs the parameter change instructing operation to temporarily change the value of the specific parameter, the secondary setting unit 37B sets in the save area 905B the primary indicated value before being changed. Thereafter, the resetting unit 37C reads the primary indicated value from the save area 905B at the time of resetting, and sets the primary indicated value again in the normal area 905A. When the primary indicated value is saved and stored in the save area 905B as described above, the value of the specific parameter is returned to the initial value in the state in which the primary indicated value before being changed is reliably held.

According to the present embodiment, the initial value of the specific parameter is previously stored in the ROM 903. At the power-on, the primary setting unit 37A of the parameter setting unit 37 reads the initial value from the ROM 903, sets the initial value in the RAM 905, and also sets the primary indicated value in the RAM 905. The primary setting unit 37A thus overwrites and updates the value stored in the RAM 905. With this configuration, even when an initial value of a specific parameter held since, for example, factory shipment is used, a primary indicated value on which the intention of an operator is reflected is set in the RAM 905 later.

According to the present embodiment, the resetting unit 37C of the parameter setting unit 37 resets the primary indicated value in the RAM 905 on condition that a predetermined time has elapsed from the setting of the secondary indicated value by the secondary setting unit 37B, as the return requirement. With this configuration, in the case where the operator performs the parameter change instructing operation to change the value of the specific parameter to the secondary indicated value by himself or herself, even when the operator does not perform the subsequent operation, the changed value of the specific parameter is reliably returned to the initial value after the lapse of the predetermined time from the change to the secondary indicated value.

Modifications, Etc

It should be noted that the embodiment is not limited to the foregoing description, and various modifications may be made within a range departing from the scope and technical idea of the disclosure. Such modifications will be described below in succession. In the respective modifications, portions similar to those in the foregoing embodiment are denoted with the identical reference signs; therefore, the description thereof will be omitted or simplified as appropriate.

Case of Setting Return Requirement Different from Measurement by Timer

In the foregoing embodiment, as described with reference to FIG. 7 (e.g., step S40, step S45), the control program module 32 executes the power conversion control process using the indicated value of the specific parameter, and the return requirement for returning to the primary indicated value the indicated value of the specific parameter is satisfied on condition that the elapsed time measured by the timer 908 reaches the predetermined time. However, the condition is not limited thereto. For example, the return requirement may be satisfied on condition that, when the power to the motor control device 12 is turned on again, the resetting unit 37C reads the primary indicated value "108" from the save area 905B, and writes the primary indicated value "108" into the normal area 905A of the RAM 905. With this configuration, in the case where the operator performs the parameter change instructing operation to change the value of the specific parameter to the secondary indicated value by himself or herself, even when the operator does not perform the subsequent operation, the changed value of the specific parameter is reliably returned to the initial value on condition that the power to the motor control device 12 is turned on again.

Modification in which No Save Area is Disposed

The present modification is different from the foregoing embodiment in that the RAM 905 has no save area 905B and normal area 905A, and the changed value of the specific parameter is returned to the initial value based on the parameter change instructing operation performed by the user. In the present modification, the control program module 32 executes the power conversion control process by reference to the indicated value set in the RAM 905.

Outline of Method According to the Present Modification

Figure 8:
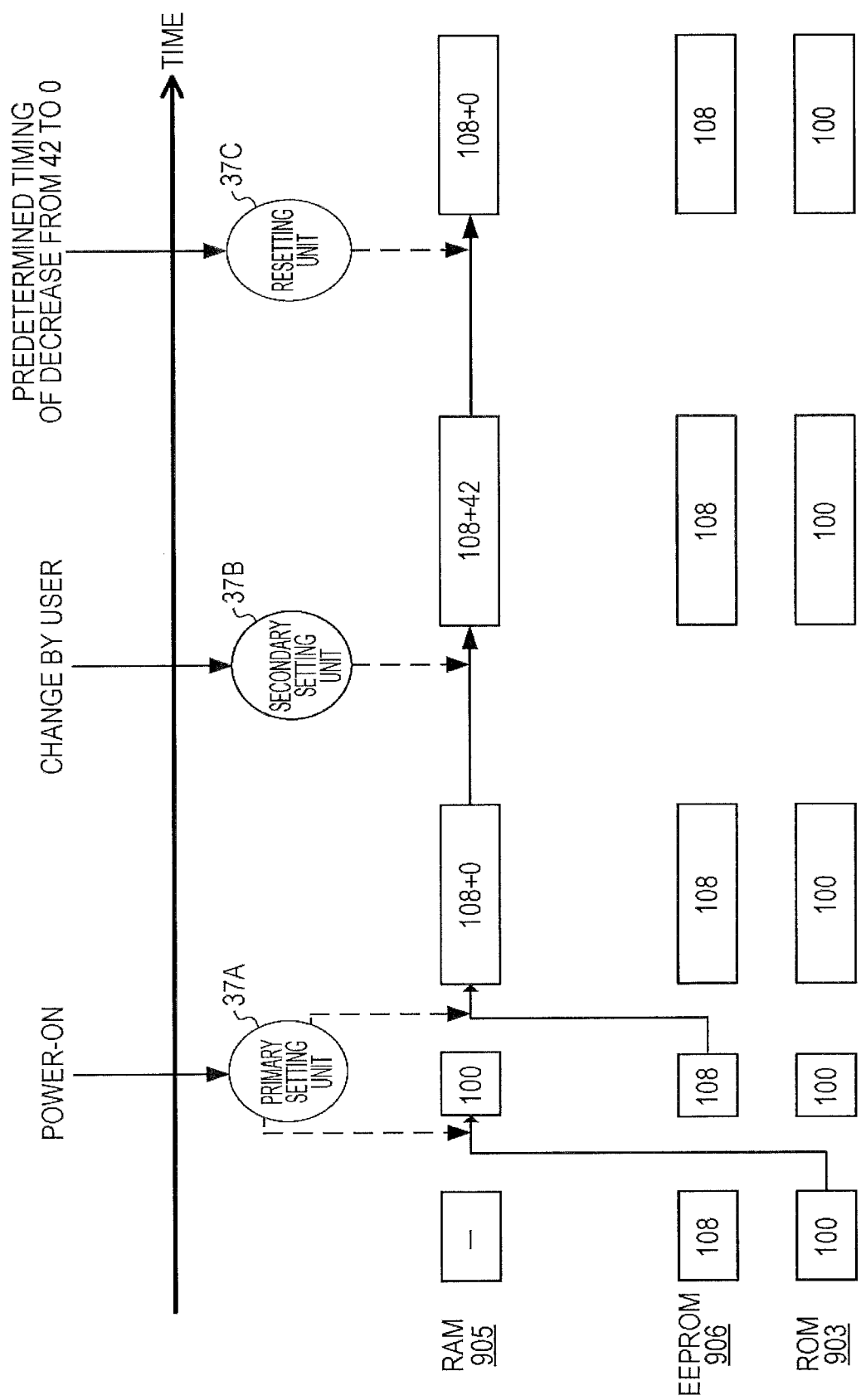
FIG. 8 is an explanatory diagram of an outline of a method according to a modification in which no save area is disposed, the method being performed by the primary setting unit, the secondary setting unit, and the resetting unit in the parameter setting unit.

With reference to FIG. 8 similar to FIG. 5 illustrating the outline of the method according to the foregoing embodiment, a description will be given of the outline of a method according to the present modification, the method being performed by the primary setting unit 37A, secondary setting unit 37B, and resetting unit 37C in the parameter setting unit 37.

As illustrated in FIG. 8, the present modification is similar to the foregoing embodiment in that the ROM 903 stores an initial value "100" of a specific parameter. The EEPROM 906 also previously stores an indicated value "108" of the specific parameter. With regard to the indicated value "108", the operator selects the specific parameter through the parameter selecting unit 13B of the external terminal 13, inputs the indicated value "108" through the indicated value input unit 13C of the external terminal 13, and instructs a change in the indicated value "108" through the instruction unit 13D of the external terminal 13.

Thereafter, at the power-on of the motor control device 12, the primary setting unit 37A of the parameter setting unit 37 reads the initial value "100" from the ROM 903, writes the initial value "100" into the RAM 905, and sets the initial value "100" as an indicated value in the RAM 905, in a manner similar to that described in the foregoing embodiment. In addition, the primary setting unit 37A reads the indicated value "108" from the EEPROM 906. At this time, the primary setting unit 37A writes, into the RAM 905, a value of "108+0" representing a sum of a fixed value portion taking a fixed value "108" (an example of a first value) and a variable value portion taking a variable value with "0" (an example of a second value) defined as an initial value, based on the indicated value "108" thus read. The primary setting unit 37A thus overwrites and updates the value stored in the RAM 905, and sets the value of "108+0" as a primary indicated value in the RAM 905.

Thereafter, for example, the operator performs the parameter change instructing operation of selecting the specific parameter through the parameter selecting unit 13B, inputting a new indicated value "150" through the indicated value input unit 13C, and changing the indicated value "108" to the indicated value "150" through the instruction unit 13D. When the parameter setting unit 37 receives the relevant parameter change command from the external terminal 13, the secondary setting unit 37B of the parameter setting unit 37 changes the value "0" of the variable value portion stored in the RAM 905 to a value of "42" (an example of a decrease start value) representing a difference between the new indicated value "150" and the value "108" of the fixed value portion stored in the RAM 905. As a result, the secondary setting unit 37B overwrites and updates the value stored in the RAM 905 with the value of "108+42", and sets the value of "108+42" as a secondary indicated value in the RAM 905. In other words, the secondary indicated value "150" is substantially set in place of the primary indicated value "108" in the RAM 905.

Immediately after the secondary indicated value "108+42" is set in the RAM 905, the value "42" of the variable value portion is subjected to a predetermined decrease process. Specifically, the resetting unit 37C of the parameter setting unit 37 sequentially subtracts an appropriate decrease deviation A from the value of "42" every predefined certain cycle. The resetting unit 37C thus overwrites and updates the value stored in the RAM 905 each time this processes ends. Thereafter, when the value of the variable value portion sequentially decreases to reach "0" that is equal to the initial value, the resetting unit 37C overwrites and updates the value stored in the RAM 905 with the primary indicated value "108+0", thereby resetting the primary indicated value "108+0" in the RAM 905. In other words, the primary indicated value "108" is reset in place of the secondary indicated value "150" in the RAM 905. In the present modification, the value of the variable value portion is used as a requirement for resetting the primary indicated value "108" in the RAM 905, in other words, a return requirement for returning, to the primary indicated value, the indicated value of the specific parameter to be used in the power conversion control process which the control program module 32 executes. It is determined that the return requirement is satisfied on condition that the variable value portion takes the value of "0" as the initial value.

Control Procedure

With reference to a flowchart of FIG. 9 similar to FIG. 7 illustrating the control procedure according to the foregoing embodiment, next, a description will be given of an exemplary control procedure to be executed by the parameter setting unit 37 in order to embody the foregoing method according to the present modification. The present modification is similar to the foregoing embodiment in that this flow starts at the power-on of the motor control device 12, and is continuously executed until the parameter setting mode is canceled through the input keys 132. Although not illustrated in FIG. 9, in a case where the parameter setting mode is selected anew through the input keys 132 after the power-on of the motor control device 12, step S5 and step S10 are not carried out in the flowchart of FIG. 9.

Figure 9:
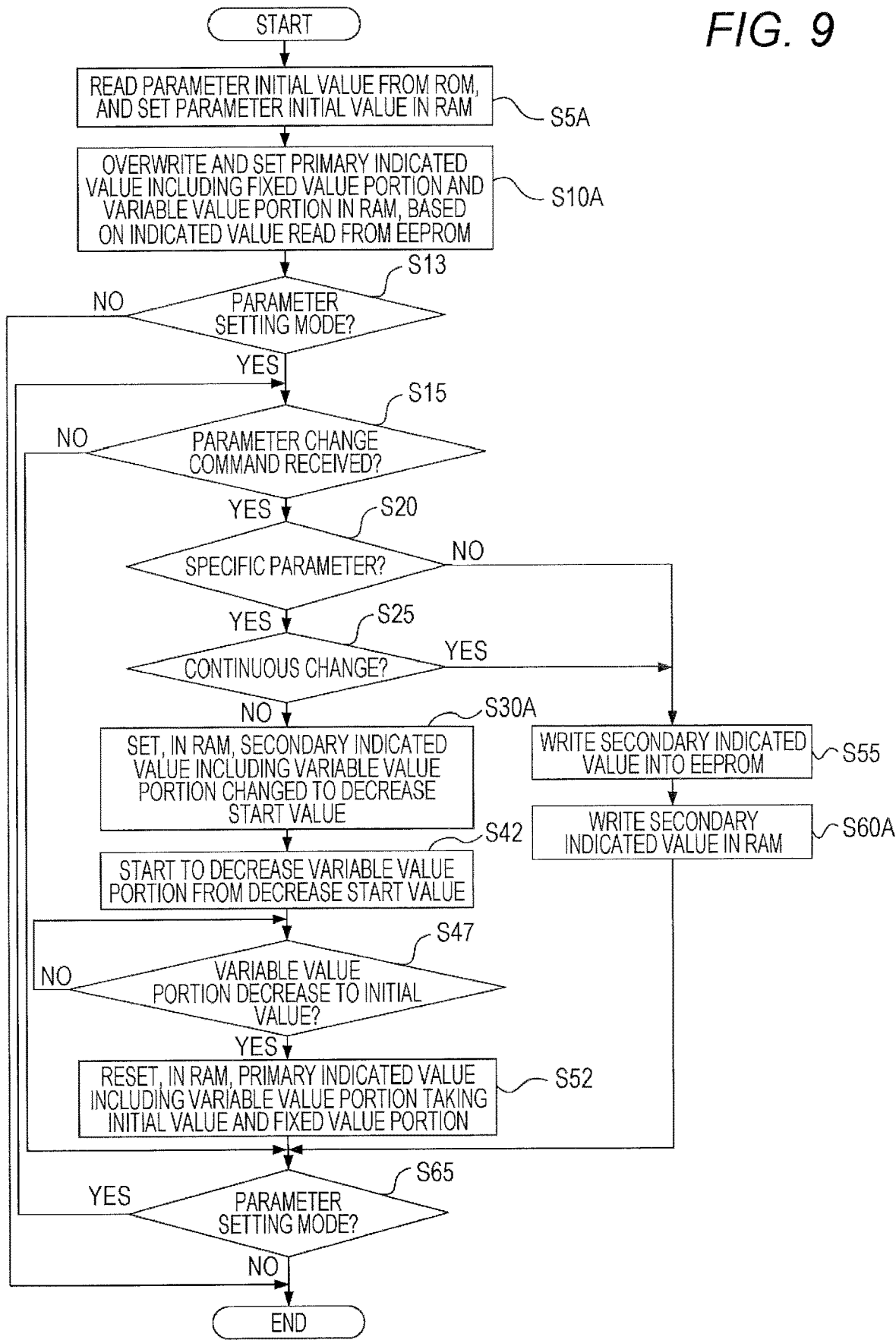
FIG. 9 is a flowchart of a control procedure to be executed by the parameter setting unit.

The flow illustrated in FIG. 9 includes step S5A, step S10A, step S30A, and step S60A in place of step S5, step S10, step S30, and step S60 in the flow illustrated in FIG. 7. The flow illustrated in FIG. 9 also includes step S42, step S47, and step S52 after step S30A in place of step S35, step S40, step S45, and step S50 after step S30 in the flow illustrated in FIG. 7.

Specifically, in step S5A to be carried out first at the power-on, the primary setting unit 37A of the parameter setting unit 37 reads an initial value of a control parameter from the ROM 903, writes the initial value into the RAM 905, and sets the written initial value as an indicated value in the RAM 905. In step S10A, the primary setting unit 37A of the parameter setting unit 37 reads an indicated value from the EEPROM 906, and writes into the RAM 905 a sum of a fixed value portion and a variable value portion based on the indicated value. The primary setting unit 37A thus overwrites and updates the value stored in the RAM 905, and sets the overwritten value as a primary indicated value in the RAM 905. At this time, the variable value portion takes a value set at a predefined initial value. As a result, the control program module 32 executes the power conversion control process based on the primary indicated value set in the RAM 905.

Thereafter, step S13, step S15, step S20, and step S25 are carried out in manners similar to those in FIG. 7. When the determination in step S20 is not satisfied and when the determination in step S25 is satisfied, the processing proceeds to step S60A via step S55 similar to that in FIG. 7. In step S60A, the secondary setting unit 37B of the parameter setting unit 37 writes the indicated value contained in the parameter change command received in step S15 into the RAM 905. The secondary setting unit 37B thus overwrites and updates the value stored in the RAM 905, and sets the overwritten value as a secondary indicated value in the RAM 905. As a result, the control program module 32 executes the power conversion control process based on the secondary indicated value set in the RAM 905. After step S60A, the processing proceeds to step S65 in which the parameter setting unit 37 determines whether the parameter setting mode is selected, in a manner similar to that in FIG. 7.

On the other hand, when the parameter change command received in step S15 is an instruction for the specific parameter temporarily changing process in step S25, the determination in step S25 is not satisfied (S25: NO). The processing then proceeds to step S30A.

In step S30A, the secondary setting unit 37B of the parameter setting unit 37 changes the value of the variable value portion stored in the RAM 905 in step S10A to a decrease start value corresponding to a difference between the new indicated value contained in the parameter change command received in step S15 and the value of the fixed value portion stored in the RAM 905. As a result, the secondary setting unit 37B overwrites and updates the value stored in the RAM 905 with the sum of the fixed value portion and the variable value portion taking the decrease start value, and sets the sum as a secondary indicated value in the RAM 905. As a result, the control program module 32 executes the power conversion control process based on the secondary indicated value set in the RAM 905.

Upon completion of the write of the secondary indicated values in step S30A, in step S42, the resetting unit 37C of the parameter setting unit 37 starts the predetermined process of decreasing the variable value portion stored in the RAM 905 from the decrease start value. As described above, the resetting unit 37C sequentially subtracts, for example, the appropriate decrease deviation A from the decrease start value. The resetting unit 37C thus overwrites and updates the value stored in the RAM 905 each time this process ends.

In step S47, next, the resetting unit 37C of the parameter setting unit 37 determines whether the value of the variable value portion that sequentially decreases by the decrease process decreases to the initial value of the variable value portion set in step S10A. The determination is not satisfied (S47: NO) until the value becomes equal to the initial value, so that the processing is in a loop standby state. When the value becomes equal to the initial value, the determination is satisfied (S47: YES). The processing then proceeds to step S52.

In step S52, the resetting unit 37C of the parameter setting unit 37 writes again into the RAM 905 the primary indicated value representing the sum of the variable value portion taking the initial value and the fixed value portion. The resetting unit 37C thus overwrites and updates the value stored in the RAM 905 with the primary indicated value. As a result, the control program module 32 executes the power conversion control process based on the primary indicated value again. After step S52, the processing proceeds to step S65 in which the parameter setting unit 37 determines whether the parameter setting mode is selected, in a manner similar to that in FIG. 7.

The determination in step S65 is satisfied (S65: YES) during a period in which the parameter setting mode is selected through the external terminal 13 in a manner similar to that in FIG. 7. The processing then returns to step S15. On the other hand, when the external terminal 13 cancels the selection of the parameter setting mode, the determination in step S65 is not satisfied (S65: NO). The processing thus ends.

Exemplary Advantageous Effects of the Present Modification

The present modification produces advantageous effects similar to those produced in the foregoing embodiment. Also in the present modification, first, the primary setting unit 37A of the parameter setting unit 37 sets the primary indicated value of the specific parameter in the RAM 905. When the operator performs the parameter change instructing operation through the external terminal 13 in order to temporarily change the primary indicated value thus set, the secondary setting unit 37B sets in the RAM 905 the secondary indicated value in accordance with the parameter change instructing operation, in place of the stored primary indicated value. The resetting unit 37C of the parameter setting unit 37 resets in the RAM 905 the initial primary indicated value in place of the stored secondary indicated value when the predetermined return requirement is satisfied after the secondary indicated value is set. As a result, in the case where the operator temporarily changes the value of the specific parameter through the operation by himself or herself, the changed value of the specific value is automatically returned to the initial value even when the operator does not perform the subsequent operation. This results in improvement of convenience for the operator. Also in the present modification, a typical example of an advantageous effect includes an advantageous effect to be produced in a case of using, as the specific parameter, the threshold value for issuing an alarm.

According to the present modification, the primary setting unit 37A sets the sum of the fixed value portion and the variable value portion taking the initial value, as the primary indicated value in the RAM 905. When the operator temporarily changes the value of the specific parameter, the secondary setting unit 37B sets a sum of the fixed value portion and the decrease start value substituted into the variable value portion, as the secondary indicated value in the RAM 905. The value of the variable value portion sequentially decreases from the decrease start value after the secondary indicated value is set. The return requirement is satisfied on condition that the value of the variable value portion decreases to the initial value. In response to this, when the value of the variable value portion returns to the initial value, the resetting unit 37C resets in the RAM 905 the primary indicated value representing the sum of the fixed value portion and the initial value of the variable value portion. With this method, the value of the specific parameter is returned to the initial value without the necessity of particularly providing in the RAM 905 the save area 905B for saving the primary indicated value, unlike the foregoing embodiment.

Other Modifications

In the foregoing description, the motor control device 12 includes the converter 21 and the inverter 22. Specifically, the motor control device 12 includes the inverter circuit that generates a variable-frequency three-phase AC output from the AC power source 15. However, the configuration of the motor control device 12 is not limited thereto. For example, the motor control device 12 may include a typical voltage inverter, a current inverter or any inverter circuit. The parameter setting and changing method according to the foregoing embodiment is applicable to a motor control device having a function of driving the motor 11 while optionally controlling the rotation speed of the motor 11. Accordingly, the foregoing method may be applied to, for example, at least one specific parameter among a plurality of control parameters for a servo controller or a servo amplifier that controls a driven state of a servo motor. This case also produces advantageous effects similar to those described above.

In FIGS. 1, 3, and 4, arrows each indicate an exemplary flow of a signal and do not intend to limit a direction in which a signal flows.

The flowchart of FIG. 7 and the flowchart of FIG. 9 do not intend to limit the foregoing embodiment and modifications to the procedures in FIGS. 7 and 9. In these procedures, for example, addition or omission of a step or change of step order may be made within a range departing from the scope and technical idea of the disclosure.

In addition to the foregoing description, the methods according to the embodiment and modifications may be used in combination as appropriate.

Although not exemplified in detail, the foregoing embodiment and others may be modified variously within a range departing from the scope of the disclosure.

What is claimed is:
1. A motor control device comprising:
   a first storage configured to store indicated values of control parameters;
   motor control circuitry configured to control a motor based on the indicated values stored in the first storage;
   primary setting circuitry configured to set in the first storage at least one indicated value among the indicated values as a primary indicated value which corresponds to specific parameter among the control parameters;
   secondary setting circuitry configured to replace, based on a change instruction input via a terminal, the primary indicated value stored in the first storage with a secondary indicated value in accordance with the change instruction; and
   resetting circuitry configured to replace the secondary indicated value stored in the first storage with the primary indicated value when a return requirement is satisfied after the secondary setting circuitry has replaced the primary indicated value with the secondary indicated value.

2. The motor control device according to claim 1, wherein the first storage comprises
   a first area to which the motor control circuitry refers in order to control the motor, and
   a second area disposed separately from the first area,
   the primary setting circuitry is configured to set the primary indicated value in the first area,
   the secondary setting circuitry is configured to set in the second area the primary indicated value read from the first area, and is configured to set the secondary indicated value in the first area based on the change instruction input through the terminal, and the resetting circuitry is configured to reset in the first area the primary indicated value read from the second area when the return requirement is satisfied.

3. The motor control device according to claim 1, wherein the primary setting circuitry is configured to set in the first storage the primary indicated value representing a sum of a first value and a second value, the first value being a fixed value portion fixedly taking the first value, the second value being a variable value portion variable with an initial value defined as the second value, the secondary setting circuitry is configured to set in the first storage the secondary indicated value representing a sum of the first value of the fixed value portion and a predetermined decrease start value that is substituted into the variable value portion and is larger than the second value, based on the change instruction input via the terminal, and the resetting circuitry is configured to reset in the first storage the primary indicated value representing a sum of the first value of the fixed value portion and the second value to be given, when the return requirement is satisfied, from the variable value portion decreasing from the decrease start value.

4. The motor control device according to claim 1, further comprising:

a second storage configured to store an initial value of the specific parameter, wherein the primary setting circuitry is configured to read the initial value from the second storage, set the initial value in the first storage, and set the primary indicated value in the first storage in which the initial value is set in order to overwrite and update the value stored in the first storage at a timing when electric power is supplied to the primary setting circuitry.

5. The motor control device according to claim 4, wherein when an instruction of changing the specific parameter is input via the terminal while selecting a mode of continuously changing the specific parameter, the secondary setting circuitry and the resetting circuitry are not activated, the primary setting circuitry further rewrites the value of the specific parameter stored in the second storage, based on the instruction.

6. The motor control device according to claim 1, wherein the terminal includes a display configured to display a setting state of the motor control device, the resetting circuitry is configured to transmit, during a period in which the return requirement is not satisfied, a signal indicating that the return requirement is not satisfied, to the terminal, and the display is configured to display information indicating that the return requirement is not satisfied, based on the signal.

7. The motor control device according to claim 1, wherein the resetting circuitry is configured to reset the primary indicated value in the first storage on condition that a predetermined time has elapsed after the secondary setting circuitry sets the secondary indicated value or on condition that power is turned on again, as the return requirement.

8. A motor control method comprising:

storing indicated values of control parameters;

controlling a motor based on the indicated values stored in the first storage;

setting in the first storage at least one indicated value among the indicated values as a primary indicated value which corresponds to specific parameter among the control parameters;

replacing, based on a change instruction input via a terminal, the primary indicated value stored in the first storage with a secondary indicated value in accordance with the change instruction; and replacing the secondary indicated value stored in the first storage with the primary indicated value when a return requirement is satisfied after the secondary setting circuitry has replaced the primary indicated value with the secondary indicated value.

* * * * *